US012776249B2

(12) United States Patent
Park et al.

(10) Patent No.: US 12,776,249 B2
(45) Date of Patent: Oct. 27, 2026

(54) DISPLAY DEVICE AND DISPLAY DRIVING METHOD

(71) Applicant: LG Display Co., Ltd., Seoul (KR)

(72) Inventors: JongChul Park, Paju-si (KR); Jinyoung Oh, Paju-si (KR); Minsung Kang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/221,236

(22) Filed: May 28, 2025

(65) Prior Publication Data

US 2026/0148678 A1 May 28, 2026

(30) Foreign Application Priority Data

Nov. 25, 2024 (KR) ........................ 10-2024-0169815

(51) Int. Cl.
*G09G 3/20* (2006.01)

(52) U.S. Cl.
CPC ... *G09G 3/2096* (2013.01); *G09G 2300/0842* (2013.01); *G09G 2310/0289* (2013.01); *G09G 2320/041* (2013.01)

(58) Field of Classification Search
None
See application file for complete search history.

(56) References Cited

U.S. PATENT DOCUMENTS

2018/0240423 A1* 8/2018 Park ..................... G09G 3/3685
2020/0234669 A1* 7/2020 Kuo ..................... G09G 3/3677

FOREIGN PATENT DOCUMENTS

KR 10-2013-0071206 A 6/2013
KR 10-2016-0017819 A 2/2016
KR 10-2019-0142202 A 12/2019

* cited by examiner

*Primary Examiner* — Nicholas J Lee
(74) *Attorney, Agent, or Firm* — Birch, Stewart, Kolasch & Birch, LLP

(57) ABSTRACT

A display device in some examples can include a display panel in which two subpixels share one data line and are disposed to be controlled by two different gate signals, a gate driving circuit supplying a gate signal to the display panel, a data driving circuit supplying a data voltage to the display panel, a memory configured to store image data to be displayed on the display panel, a timing controller configured to determine a sequence type based on an image pattern of a designated area detected from the image data and to control the gate driving circuit and the data driving circuit so that the designated area is driven according to a selected final sequence.

19 Claims, 13 Drawing Sheets

DISPLAY DEVICE AND DISPLAY DRIVING METHOD

CROSS-REFERENCE TO RELATED APPLICATION

This application claims priority to Korean Patent Application No. 10-2024-0169815, filed in the Republic of Korea on Nov. 25, 2024, which is hereby expressly incorporated by reference for all purposes as if fully set forth herein into the present application.

BACKGROUND

Field

Embodiments of the present disclosure relate to a display device and a display driving method.

Description of the Related Art

The growth of the intelligent society leads to increased demand for image display devices and use of various types of display devices, such as liquid crystal displays, organic light emitting displays, etc.

Among these display devices, the organic light emitting display device uses self-emissive organic light emitting diodes, providing advantages, such as a fast response and better contrast ratio, luminous efficiency, luminance, and viewing angle.

The display device can include light emitting elements respectively arranged in a plurality of subpixels disposed on a display panel and cause the light emitting diodes to emit light by controlling the voltage applied to the light emitting elements, thereby displaying images while controlling the brightness of each subpixel.

Various studies are ongoing to improve the performance of display devices, focusing on aspects such as increasing screen size, reducing thickness and weight, enhancing resolution, and lowering power consumption.

Recently, a display device employing a double rate driving (DRD) method has been developed to reduce circuit costs by halving the number of data lines while doubling the number of gate lines, thereby decreasing the number of data driving circuits compared to conventional designs.

However, in the case of double rate driving, the amount of toggling in data voltage increases depending on the input image pattern, which can lead to a significant rise in the heat generated by the data driving circuits. The heat generation of the data driving circuits can increase as the display panel becomes larger and the driving frequency increases.

SUMMARY OF THE DISCLOSURE

Embodiments of the present disclosure can provide a display device and a display driving method capable of suppressing an increase in the heat generation temperature of a data driving circuit during a double rate driving process.

Embodiments of the present disclosure can provide a display device and a display driving method capable of suppressing an increase in the heat generation temperature of a data driving circuit by selecting a driving sequence that can minimize the heat generation temperature of the data driving circuit according to the amount of toggling in data voltage.

Embodiments of the present disclosure can provide a display device and a display driving method capable of suppressing an increase in the heat generation temperature of a data driving circuit by selecting a driving sequence that can minimize heat generation according to an input image pattern Objects of embodiments of the present disclosure are not limited to those set forth herein, and other unmentioned objects would be apparent to one of ordinary skill in the art from the following description.

Embodiments of the present disclosure can provide a display device comprising a display panel in which two subpixels share one data line and are disposed to be controlled by two different gate signals, a gate driving circuit supplying a gate signal to the display panel, a data driving circuit supplying a data voltage to the display panel, a memory configured to store image data to be displayed on the display panel, a timing controller configured to determine a sequence type based on an image pattern of a designated area detected from the image data and to control the gate driving circuit and the data driving circuit so that the designated area is driven according to a selected final sequence.

Embodiments of the present disclosure can provide a method for driving a display panel in which two subpixels share one data line and are disposed to be controlled by two different gate signals can comprise storing image data, detecting an image pattern of a designated area, determining a sequence type according to the image pattern, calculating a data toggling amount according to the sequence type, and driving with a final sequence with a minimum data toggling amount.

According to embodiments of the present disclosure, there can be provided a display device and a display driving method capable of suppressing an increase in the heat generation temperature of a data driving circuit during a double rate driving process.

According to embodiments of the present disclosure, there can be provided a display device and a display driving method capable of suppressing an increase in the heat generation temperature of a data driving circuit by selecting a driving sequence that can minimize the heat generation temperature of the data driving circuit according to the amount of toggling in data voltage.

According to embodiments of the present disclosure, there can be provided a display device and a display driving method capable of suppressing an increase in the heat generation temperature of a data driving circuit by selecting a driving sequence that can minimize heat generation according to an input image pattern The effects of the present disclosure are not limited to the foregoing objects, and other effects will be apparent to one of ordinary skill in the art from the following detailed description.

BRIEF DESCRIPTION OF THE DRAWINGS

The present disclosure will be more fully understood from the following detailed description and the accompanying drawings, which are provided for illustration only and are not intended to limit the present disclosure.

DETAILED DESCRIPTION OF THE EMBODIMENTS

Figure 1:
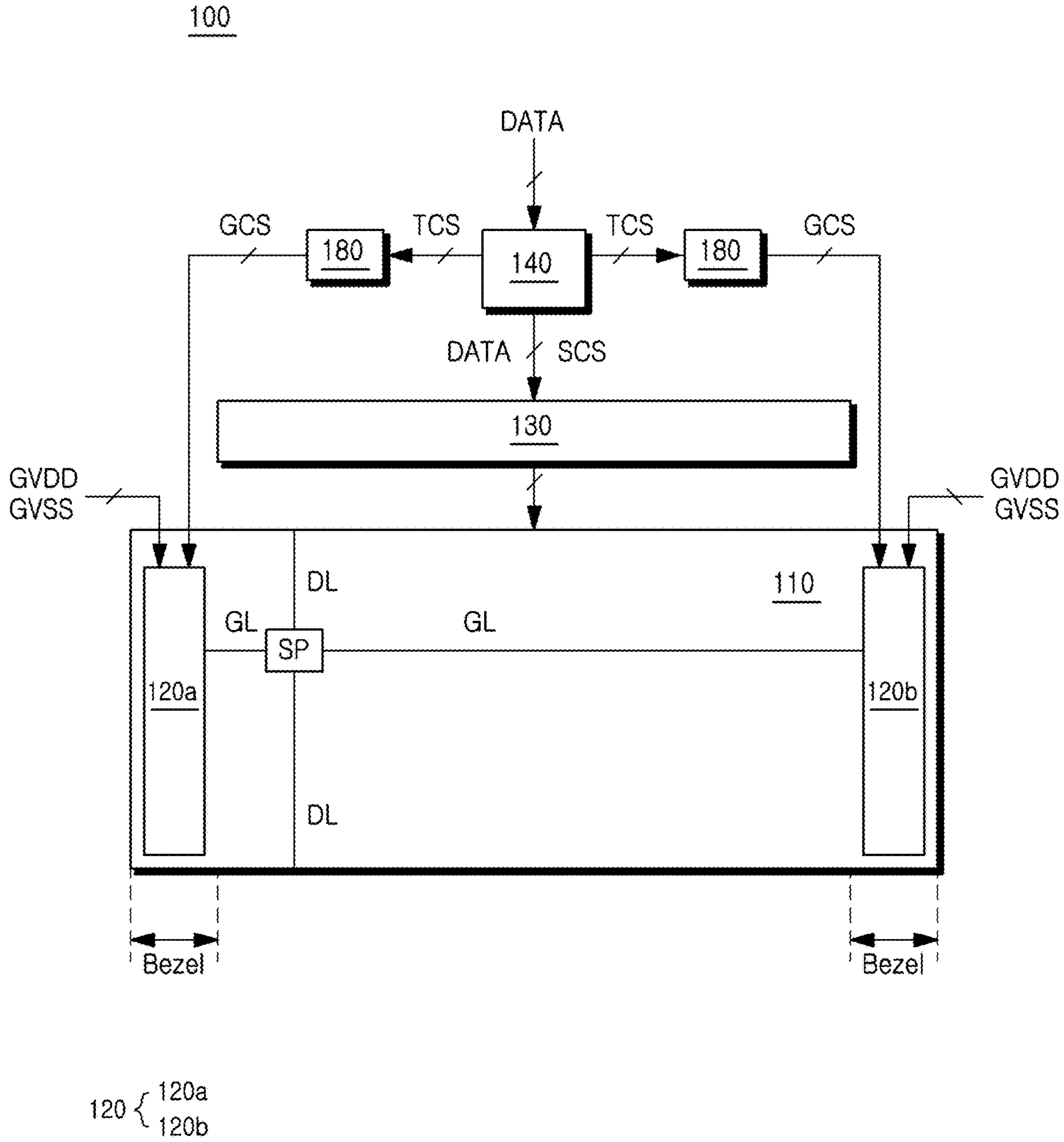
FIG. 1 is a view schematically illustrating a display device according to embodiments of the present disclosure.

Hereinafter, embodiments of the present disclosure will be described in detail with reference to example drawings. In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” can be used herein to describe elements of the present disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element can be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms can be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term “can” fully encompasses all the meanings of the term “may” and vice versa.

Hereinafter, various embodiments of the present disclosure will be described in detail with reference to the accompanying drawings. All the components of each display device according to all embodiments of the present disclosure are operatively coupled and configured.

FIG. 1 is a view schematically illustrating a display device according to embodiments of the present disclosure.

Referring to FIG. 1, a display device 100 according to embodiments of the present disclosure can include a display panel 110, a gate driving circuit 120, a data driving circuit 130, a timing controller 140, and a level shifter 180.

In the display panel 110, a plurality of data lines DL and a plurality of gate lines GL can intersect each other, and subpixels SP can be disposed in a matrix form in each intersection area, forming a subpixel array.

In the case of a liquid crystal display device, the display panel 110 can include a liquid crystal layer formed between two substrates and can be operated in any known mode, such as a twisted nematic (TN) mode, a vertical alignment (VA) mode, an in-plane switching (IPS) mode, or a fringe field switching (FFS) mode. In the case of an organic light emitting display device, the display panel 110 can be implemented in a top emission scheme, a bottom emission scheme, or a dual-emission scheme.

One subpixel SP can include, e.g., a thin film transistor (TFT) disposed in an area formed by one data line DL and one gate line GL, a light emitting element that emits light according to a data voltage, and a storage capacitor electrically connected to the light emitting element to maintain the voltage. The thin film transistor can include a driving transistor and one or more switching transistors, and can be implemented as a P-type transistor or an N-type transistor. Alternatively, it can be implemented in a hybrid form in which a P-type transistor and an N-type transistor are mixed.

For example, when the display device 100 having a resolution of 2,160×3,840 includes four subpixels SP of white (W), red (R), green (G), and blue (B), 3,840 data lines DL can be connected to 2,160 gate lines GL and four subpixels WRGB, and thus, there can be provided 3,840×4=15,360 data lines DL. Each subpixel SP is disposed in the area formed by the gate line GL and the data line DL.

The timing controller 140 receives image data DATA from an external host system through various interface schemes. The timing controller 140 can correct the image data DATA to compensate for the driving deviation of the subpixel SP based on the sensing result of the characteristic value (e.g., the threshold voltage or mobility of the driving transistor) of the subpixel and then transmit it to the data driving circuit 130.

The timing controller 140 can receive timing signals, such as a vertical synchronization signal, a horizontal synchronization signal, and a data enable signal from the host system. The timing controller 140 generates a source control signal SCS for controlling the operation timing of the data driving circuit 130 and a timing control signal TCS for controlling the operation timing of the gate driving circuit 120 based on the timing signal input from the host system.

The source control signal SCS includes a source sampling clock, a source output enable signal, and the like. The source sampling clock is a clock for controlling the sampling timing of the image data DATA in the data driving circuit 130 based on the rising or falling edge. The source output enable signal is a signal for controlling an output timing for an analog data voltage applied to the display panel 110.

The data driving circuit 130 can include a plurality of source driving integrated chips SDIC. The data driving circuit 130 receives the image data DATA from the timing controller 140. The data driving circuit 130 generates a data voltage by converting the image data DATA into a gamma compensation voltage in response to the source control signal SCS transferred from the timing controller 140, and synchronizes the data voltage with the scan signal of the gate driving circuit 120 and supplies the same to the data lines DL of the display panel 110.

The data driving circuit 130 can be connected to the data line DL of the display panel 110 through a chip on glass (COG) process or a tape automated bonding (TAB) process.

The display device 100 can include a level shifter 180 that generates the gate control signal GCS using the timing control signal TCS output from the timing controller 140 and supplies the generated gate control signal GCS to the gate driving circuit 120. The level shifter 180 can be positioned inside the gate driving circuit 120 or can be positioned on the source printed circuit board on which the data driving circuit 130 is disposed.

The level shifter 180 can convert a transistor-transistor-logic (TTL) level voltage of the timing control signal (TCS) input from the timing controller 140 into a voltage of a turn-on level and a voltage of a turn-off level capable of switching the transistor formed on the display panel 110. Then, the level shifter 180 supplies the gate control signal GCS to the gate driving circuit 120.

The timing control signal TCS can include an on clock, an off clock, a gate start pulse, and an alternating control pulse.

The gate control signal GCS can include an output start pulse, a gate clock, an even-numbered alternating current (AC) voltage, an odd-numbered AC voltage, a line selection signal, a reset signal, and a panel on signal. The gate clock can be composed of N (where N is a natural number) phase clocks having different phases.

For example, in a display device 100 having a resolution of 2,160×3,840, for 2,160 gate lines GL, when scan signals are sequentially output from the first gate line to the 2,160th gate line can be referred to as 2,160-phase driving. Sequentially outputting the scan signal to each unit of four gate lines GL, e.g., sequentially outputting the scan signal to the fifth gate line to the eighth gate line after sequentially outputting the scan signal to the first gate line to the fourth gate line, is referred to as 4-phase driving. In other words, sequentially outputting the scan signal to every N gate lines GL can be referred to as N-phase driving.

In this case, the gate driving circuit 120 can include one or more gate driving integrated circuits GDIC.

Based on the gate control signal GCS input from the level shifter 180 and the one or more power supply voltages GVDD and GVSS input from the power management circuit, the gate driving circuit 120 can output the display scan signal during the display driving period and output the sensing scan signal for sensing the characteristic value of the subpixel SP during the blank period.

The gate driving circuit 120 can be directly formed on the substrate of the display panel 110 in a gate in panel (GIP) manner.

The gate driving circuit 120 can be formed in a bezel area in which an image is not displayed on the display panel 110, but is not limited thereto. The gate driving circuit 120 can be formed in a double bank structure in which the first gate driving circuit 120*a* is disposed in the first bezel area of the display panel 110 and the second gate driving circuit 120*b* is disposed in the second bezel area of the display panel 110 to minimize distortion of the scan signal due to signal delay.

The timing controller 140 can control the display driving operation and the sensing driving operation for the subpixel lines of the display panel 110 based on the source control signal SCS and the timing control signal TCS, thereby sensing the characteristic values for the subpixels SP in real time even in the period in which the image is displayed.

Here, the subpixel line refers to a collection of subpixels SP in the amount of one line, adjacent to each other in the horizontal direction.

The sensing driving operation refers to an operation of sensing the characteristic value of the corresponding subpixel SP by applying sensing data to subpixels SP disposed in a specific subpixel line, and updating the compensation value for compensating for a change in the characteristic value of the corresponding subpixel SP based on the sensing result.

The display device 100 can include a power management circuit that supplies various voltages or currents to the display panel 110, the gate driving circuit 120, the data driving circuit 130, or the like, or controls various voltages or currents to be supplied.

The power management circuit generates power necessary for driving the display panel 100, the gate driving circuit 120, and the data driving circuit 130 by adjusting the direct current (DC) voltage supplied from the external host system.

The display device 100 can be one of various types of devices, such as liquid crystal displays, organic light emitting diode displays, or plasma display panels.

Figure 2:
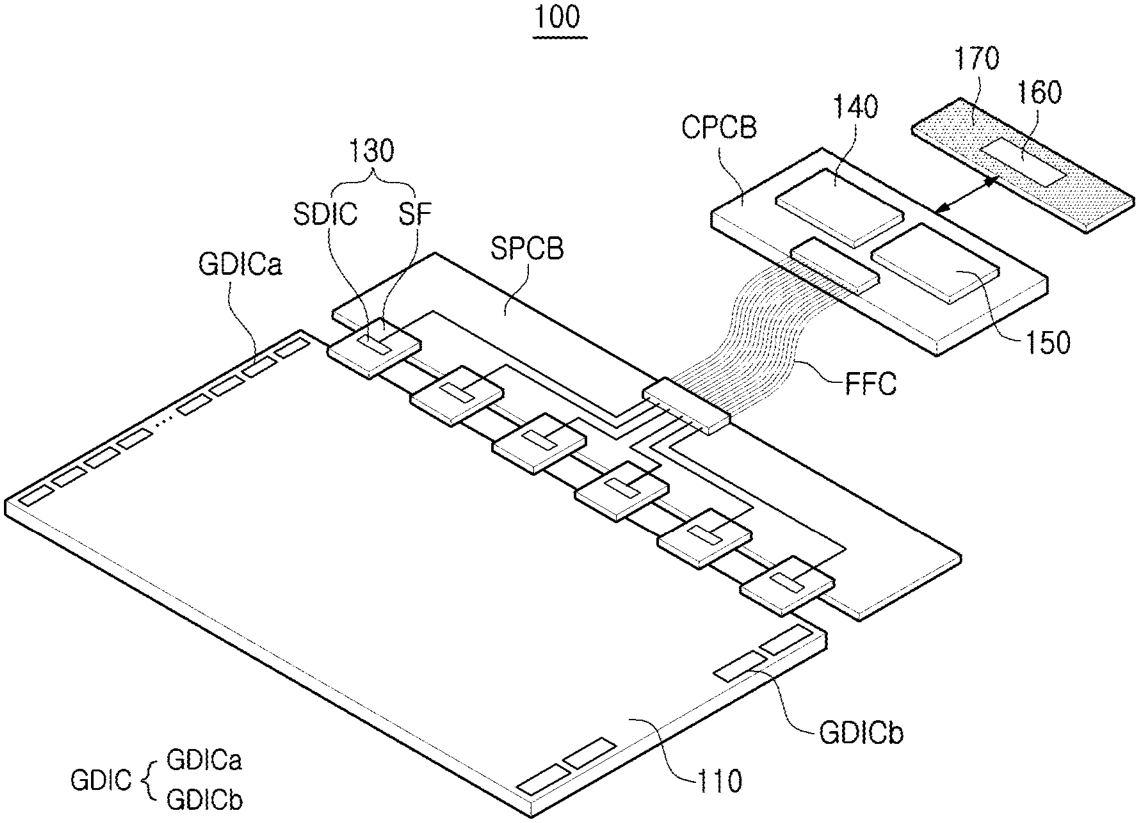
FIG. 2 is a system example view illustrating a display device according to embodiments of the present disclosure.

FIG. 2 is a system example view illustrating a display device according to embodiments of the present disclosure.

Referring to FIG. 2 illustrating an example in which in the display device 100 according to embodiments of the present disclosure, the data driving circuit 130 is implemented by a chip on film (COF) type among various types (e.g., TAB, COG, and COF), and the gate driving circuit 120 is implemented by a gate in panel (GIP) type among various types (e.g., TAB, COG, COF, and GIP).

When the gate driving circuit 120 is implemented in the GIP type, the plurality of gate driving integrated circuits GDICa and GDICb included in the gate driving circuit 120 can be directly formed in the bezel area of the display panel 110. In this case, the gate driving integrated circuits GDICa and GDICb can receive various signals (e.g., a gate clock, a gate high signal, a gate low signal, etc.) necessary for generating scan signals through gate driving-related signal lines disposed in the bezel area.

Likewise, one or more source driving integrated circuits SDIC included in the data driving circuit 130 each can be mounted on the source film SF, and one side of the source film SF can be electrically connected with the display panel 110. Signal lines for electrically connecting the source driver integrated circuit SDIC and the display panel 110 can be disposed on the source film SF.

The display device 100 can include at least one source printed circuit board SPCB for circuit connection between a plurality of source driving integrated circuits SDIC and other devices and a control printed circuit board CPCB for mounting control components and various electric devices.

The other side of the source film SF where the source driving integrated circuit SDIC is mounted can be connected to at least one source printed circuit board SPCB. In other words, one side of the source film SF where the source driving integrated circuit SDIC is mounted can be electrically connected with the display panel 110, and the other side thereof can be electrically connected with the source printed circuit board SPCB.

The timing controller 140 and the power management circuit 150 can be mounted on the control printed circuit board CPCB. The timing controller 140 can control the operation of the data driving circuit 130 and the gate driving circuit 120. The power management circuit 150 can supply driving voltage or current to the display panel 110, the data driving circuit 130, and the gate driving circuit 120 and control the supplied voltage or current.

Further, a memory capable of storing image data DATA input from a host system can be disposed on the control printed circuit board CPCB.

At least one source printed circuit board SPCB and control printed circuit board CPCB can be circuit-connected through at least one connection member. The connection member can include, e.g., a flexible printed circuit FPC or a flexible flat cable FFC. The at least one source printed circuit board SPCB and control printed circuit board CPCB can be integrated into a single printed circuit board.

The display device 100 can further include a set board 170 electrically connected to the control printed circuit board CPCB. In this case, the set board 170 can also be referred to as a power board. A main power management circuit 160 for managing the overall power of the display device 100 can be present on the set board 170. The main power management circuit 160 can interwork with the power management circuit 150.

In the so-configured display device 100, the driving voltage is generated in the set board 170 and transferred to the power management circuit 150 in the control printed circuit board CPCB. The power management circuit 150 transfers a driving voltage necessary for display driving or characteristic value sensing to the source printed circuit board SPCB through the flexible printed circuit FPC or flexible flat cable FFC. The driving voltage transferred to the source printed circuit board SPCB is supplied to emit light or sense a specific subpixel SP in the display panel 110 through the source driving integrated circuit SDIC.

Each of the subpixels SP arranged in the display panel 110 in the display device 100 can include a light emitting element and a circuit element, e.g., a driving transistor, for driving the organic light emitting diode.

The type and number of circuit elements constituting each subpixel SP can be varied depending on functions to be provided and design schemes.

Figure 3:
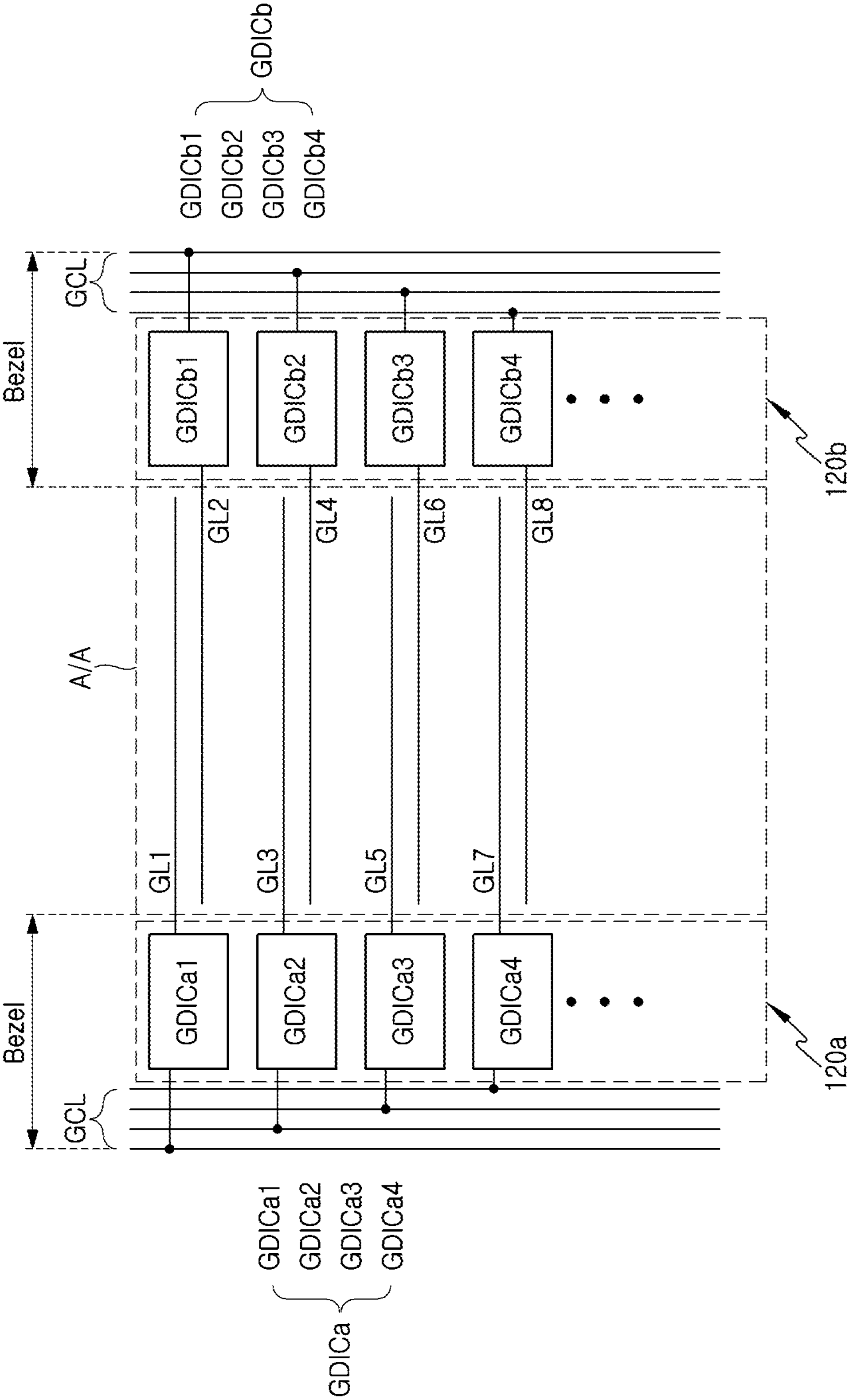
FIG. 3 is a view illustrating an example of a display panel in which a gate driving circuit is implemented in a gate-in-panel type in a display device according to embodiments of the present disclosure.

FIG. 3 is a view illustrating an example of a display panel in which a gate driving circuit is implemented in a gate-in-panel type in a display device according to embodiments of the present disclosure.

Referring to FIG. 3, in the display device 100 according to embodiments of the present disclosure, n gate lines GLs can be disposed in the active area A/A for displaying an image.

Here, the active area A/A is an area where a plurality of subpixels SP for emitting light of the corresponding color, such as white subpixels, red subpixels, green subpixels, and blue subpixels, are disposed to display an image. Further, a plurality of dummy subpixels that have loads similar to those of subpixels SP but do not emit light because no scan signal or data voltage is applied can be positioned at some positions in the active area A/A.

In the embodiments of the present disclosure, the active area A/A is referred to as including a plurality of subpixel areas emitting light of corresponding colors and areas where dummy subpixels not emitting light are arranged. Alternatively, the pixel array can be referred to as including a plurality of subpixel areas emitting light of corresponding colors and areas where dummy subpixels not emitting light are arranged.

The gate driving circuit 120 is embedded and disposed in a bezel area where subpixels are not formed on the left and right sides of the active area A/A, and can include n gate driving integrated circuits GDICa and GDICb corresponding to the n gate lines GL.

For example, the gate driving integrated circuit GDICa1 that supplies a scan signal through the first gate line GL1 can be disposed on the left side of the active area A/A where the first gate line GL1 extends, and the gate driving integrated circuit GDICb1 that supplies a scan signal through the second gate line GL2 can be disposed on the right side of the active area A/A.

Further, the gate driving integrated circuit GDICa2 that supplies the scan signal through the third gate line GL3 can be disposed on the left side of the active area A/A where the third gate line GL3 extends, and the gate driving integrated circuit GDICb2 that supplies the scan signal through the fourth gate line GL4 can be disposed on the right side of the active area A/A.

As such, when n/2 gate lines extend from the left side of the active area A/A and n/2 gate lines extend from the right side of the active area A/A, scan signals can be supplied by n/2 gate driving integrated circuits GDICA disposed on the left side of the active area A/A and n/2 gate driving integrated circuits GDICb disposed on the right side of the active area A/A.

In this case, the n/2 gate driving integrated circuits GDICa disposed on the left side of the active area A/A can be referred to as a first gate driving integrated circuit group, and the n/2 gate driving integrated circuits GDICb disposed on the right side of the active area A/A can be referred to as a second gate driving integrated circuit group.

In this case, each gate driving integrated circuit GDIC can further include a light emitting driving circuit supplying a light emission signal through the gate line GL along with a scan driving circuit supplying a scan signal through the gate line GL.

As such, when the gate driving circuit 120 is implemented as a gate-in-panel (GIP) type, there is no need to manufacture a separate integrated circuit having a gate driving function and bond it to the display panel 110, thus reducing the number of integrated circuits and omitting the process of connecting the integrated circuit to the display panel 110.

Further, the size of the bezel area where the integrated circuit is bonded in the display panel 110 can be decreased.

In this case, the n gate driving integrated circuits GDICs can be disposed on two opposite sides of the active area A/A, or can be disposed on one side of the display panel 110.

Meanwhile, a plurality of gate clock lines GCL can be disposed in the bezel area where subpixels are not formed on one side of the active area A/A to transfer a gate clock required for generating and outputting a scan signal to the gate driving circuits 120*a* and 120*b*.

Figure 4:
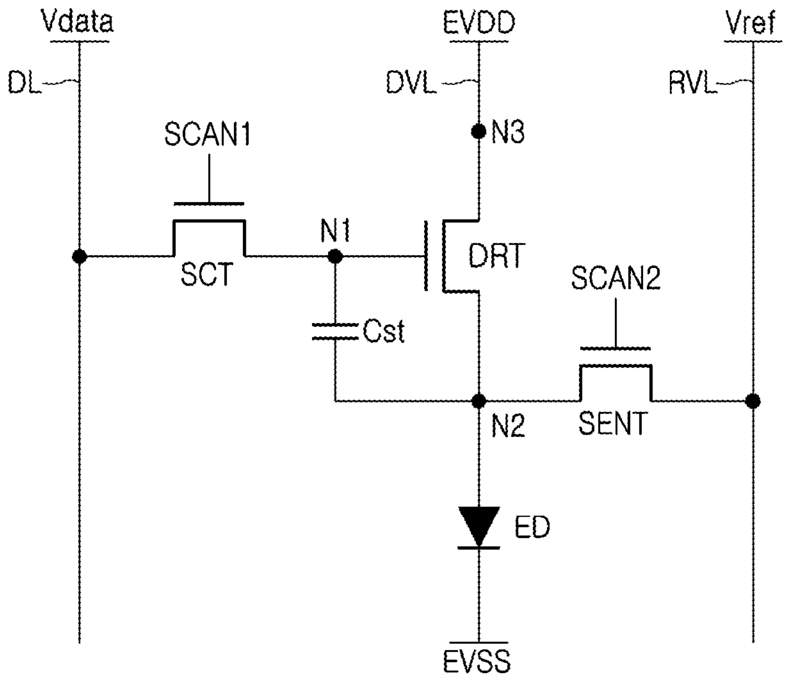
FIG. 4 is a view illustrating an example of a subpixel circuit of a display device according to embodiments of the present disclosure.

FIG. 4 is a view illustrating an example of a subpixel circuit of a display device according to embodiments of the present disclosure.

Referring to FIG. 4, in the display device 100 according to embodiments of the present disclosure, the subpixel circuit can include one or more transistors and a capacitor and can have a light emitting element disposed therein.

For example, the subpixel circuit can include a driving transistor DRT, a scan transistor SCT, a sensing transistor SENT, a storage capacitor Cst, and a light emitting element ED.

The driving transistor DRT includes the first node N1, second node N2, and third node N3. The first node N1 of the driving transistor DRT can be a gate node to which the data voltage Vdata is applied from the data driving circuit 130 through the data line DL when the scan transistor SCT is turned on.

The second node N2 of the driving transistor DRT can be electrically connected with the anode electrode of the light emitting element ED and can be the source node or drain node.

The third node N3 of the driving transistor DRT can be electrically connected with the driving voltage line DVL to which a pixel high-potential voltage EVDD is applied and can be the drain node or the source node.

In this case, during a display driving period, a pixel high-potential voltage EVDD necessary for displaying an image can be supplied to the driving voltage line DVL. For example, the high-potential voltage EVDD necessary for displaying an image can be 27V.

The scan transistor SCT is electrically connected between the first node N1 of the driving transistor DRT and the data line DL, and the gate line GL is connected to the gate node. Thus, the scan transistor SWT is operated according to the first scan signal SCAN1 supplied through the gate line GL. When turned on, the scan transistor SCT transfers the data voltage Vdata supplied through the data line DL to the gate node of the driving transistor DRT, thereby controlling the operation of the driving transistor DRT.

The sensing transistor SENT is electrically connected between the second node N2 of the driving transistor DRT and the reference voltage line RVL, and the gate line GL is connected to the gate node. The sensing transistor SENT is operated according to the second scan signal SCAN2 supplied through the gate line GL. When the sensing transistor SENT is turned on, a reference voltage Vref supplied through the reference voltage line RVL is transferred to the second node N2 of the driving transistor DRT.

In other words, as the scan transistor SCT and the sensing transistor SENT are controlled, the voltage of the first node N1 and the voltage of the second node N2 of the driving transistor DRT are controlled, so that the current for driving the light emitting element ED can be supplied.

The gate nodes of the scan transistor SCT and the sensing transistor SENT can be commonly connected to one gate line GL or can be connected to different gate lines GL. An example is shown in which the scan transistor SCT and the sensing transistor SENT are connected to different gate lines GL in which case the scan transistor SCT and the sensing transistor SENT can be independently controlled by the first scan signal SCAN1 and the second scan signal SCAN2 transferred through different gate lines GL.

On the other hand, when the scan transistor SCT and the sensing transistor SENT are connected to one gate line GL, the scan transistor SCT and the sensing transistor SENT can be simultaneously controlled by the first scan signal SCAN1 or the second scan signal SCAN2 transferred through one gate line GL, and the aperture ratio of the subpixel SP can increase.

The transistor disposed in the subpixel circuit can be an N-type transistor or a P-type transistor and, in the shown example, the transistor is an N-type transistor.

The storage capacitor Cst is electrically connected between the first node N1 and second node N2 of the driving transistor DRT and maintains the data voltage Vdata during one frame.

The storage capacitor Cst can also be connected between the first node N1 and third node N3 of the driving transistor DRT depending on the type of the driving transistor DRT. The anode electrode of the light emitting element ED can be electrically connected with the second node N2 of the driving transistor DRT, and a pixel low-potential voltage EVSS can be applied to the cathode electrode of the light emitting element ED.

The pixel low-potential voltage EVSS can be a ground voltage or a voltage higher or lower than the ground voltage. The pixel low-potential voltage EVSS can be varied depending on the driving state. For example, the pixel low-potential voltage EVSS at the time of display driving and the pixel low-potential voltage EVSS at the time of sensing driving can be set to differ from each other. The pixel low-potential voltage EVSS can also be referred to as a base voltage.

The scan transistor SCT and the sensing transistor SENT can be referred to as switching transistors controlled through scan signals SCAN1 and SCAN2.

In this case, to effectively sense a characteristic value, e.g., threshold voltage or mobility, of the driving transistor DRT, the display device 100 can use a method for measuring the current flowed by the voltage charged to the storage capacitor Cst during a characteristic value sensing period of the driving transistor DRT, which is called current sensing.

In other words, it is possible to figure out the characteristic value, or a variation in characteristic value, of the driving transistor DRT in the subpixel SP by measuring the current flowed by the voltage charged to the storage capacitor Cst during the characteristic value sensing period of the driving transistor DRT.

In this case, the reference voltage line RVL serves not only to transfer the reference voltage Vref but also as a sensing line for sensing the characteristic value of the driving transistor DRT in the subpixel. Thus, the reference voltage line RVL can also be referred to as a sensing line or a sensing channel.

As such, a subpixel circuit composed of three transistors DRT, SCT, and SENT and one capacitor Cst can be referred to as a 3T1C structure. The subpixel circuit can be variously changed. For example, without a sensing transistor SENT, a subpixel circuit composed of two transistors DRT and SCT and one capacitor Cst can be referred to as a 2T1C structure, and can be configured to further include one or more transistors and one or more capacitors.

In the display device 100 of the present disclosure, in order to reduce the number of data lines DL to which the data voltage Vdata is transferred, it can be disposed to have a double rate driving (DRD) structure in which two (or a pair) subpixels share one data line DL.

Figure 5:
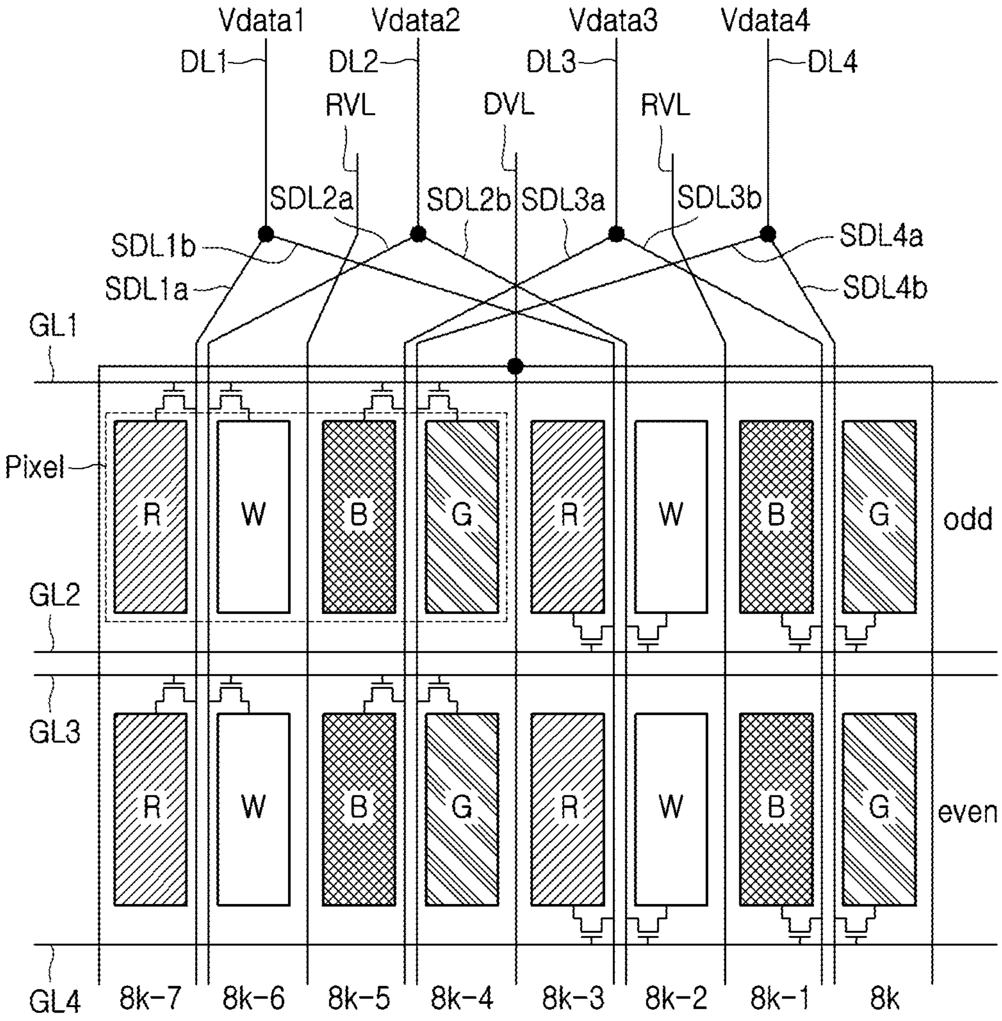
FIG. 5 is a view illustrating an example of a subpixel arrangement in a double rate driving structure in a display device according to embodiments of the present disclosure.

FIG. 5 is a view illustrating an example of a subpixel arrangement in a double rate driving structure in a display device according to embodiments of the present disclosure.

Referring to FIG. 5, the display panel 110 of the display device 100 according to embodiments of the present disclosure can display an image through a plurality of pixels disposed in a matrix form.

Each pixel can include a red subpixel R that emits red light, a green subpixel G that emits green light, a white subpixel W that emits white light, and a blue subpixel B that emits blue light. Here, a pixel structure that emits light of four colors is exemplified, but one pixel can be composed of three subpixels that emit light of red, green, and blue.

The plurality of subpixels are disposed along rows and columns on the display panel 110. In this case, a plurality of subpixels disposed along one row can be referred to as subpixel lines.

For example, if four subpixels SP1, SP2, SP3, and SP4 of white, red, green, and blue constitute one pixel in the display panel 110 having a resolution of 2,160×3,840, a total of 3,840 data lines DL can be provided by 2,160 subpixel lines and 3,840 data lines DL connected to the four subpixels SP1, SP2, SP3, and SP4.

However, when the display panel 110 is formed in a double rate driving DRD structure, two subpixels positioned in the same subpixel line can be disposed to share one data line. In this case, the subpixels sharing one data line can be left and right subpixels closest to the data line or subpixels of the same color adjacent to the data line.

Here, a case in which subpixels of the same color share one data line with respect to adjacent pixels is illustrated as an example.

For example, one pixel can include four subpixels R, W, B, and G. Here, the first subpixel R can be a red subpixel, the second subpixel W can be a white subpixel, the third subpixel B can be a blue subpixel, and the fourth subpixel G can be a green subpixel. However, the present disclosure is not limited thereto, and a plurality of subpixels can be changed into various colors (magenta, yellow, cyan).

The plurality of subpixels R, W, B, and G of the same color can be disposed in the same column. In other words, a plurality of first subpixels R can be disposed in the same column, a plurality of second subpixels W can be disposed in the same column, a plurality of third subpixels B can be disposed in the same column, and a plurality of fourth subpixels G can be disposed in the same column.

For example, a plurality of first subpixels R can be disposed in the 8k-7th and 8k-3th columns, a plurality of second subpixels W can be disposed in the 8k-6th and 8k-2th columns, a plurality of third subpixels B can be disposed in the 8k-5th and 8k-1th columns, and a plurality of fourth subpixels G can be disposed in the 8k-4th and 8kth columns. Here, k denotes a natural number of 1 or more.

In other words, the first subpixel R, the second subpixel W, the third subpixel B, and the fourth subpixel G can be sequentially repeated in the odd-numbered row or one even-numbered row.

Each of the plurality of data lines DL1, DL2, DL3, and DL4 can be branched into a plurality of sub data lines SDL1*a*, SDL1*b*, SDL2*a*, SDL2*b*, SDL3*a*, SDL3*b*, SDL4*a*, and SDL4*b*. Specifically, the first data line DL1 can be branched into two first sub data lines SDL1*a* and SDL1*b*, the second data line DL2 can be branched into two second sub data lines SDL2*a* and SDL2*b*, the third data line DL3 can be branched into two third sub data lines SDL3*a* and SDL3*b*, and the fourth data line DL4 can be branched into two fourth sub data lines SDL4*a* and SDL4*b*.

The first sub data lines SDL1 *a* and SDL1-*b* can include a 1ath sub data line SDL1*a* and a 1bth sub data line SDL1*b*, the second sub data lines SDL2*a* and SDL2*b* can include a 2ath sub data line SDL2*a* and a 2bth sub data line SDL2*b*, the third sub data lines SDL3*a* and SDL3*b* can include a 3ath sub data line SDL3*a* and a 3b sub data line SDL3*b*, and the fourth sub data lines SDL4*a* and SDL4*b* can include a 4ath sub data line SDL4*a* and a 4abth sub data line SDL4*b*.

The two first sub data lines SDL1*a* and SDL1*b* extend along the side surfaces of the two first sub pixels R disposed adjacent to each other in the row direction, and can be connected to different first sub pixels R, respectively.

Specifically, the 1ath sub data line SDL1*a* can be disposed between the plurality of first sub pixels R disposed in the 8k-7th column and the plurality of second sub pixels W disposed in the 8k-6th column, and can be electrically connected to the plurality of first sub pixels R disposed in the 8k-7th column. Further, the 1bth sub data line SDL1*b* can be disposed between the plurality of first sub pixels R disposed in the 8k-3th column and the plurality of second sub pixels W disposed in the 8k-2th column, and can be electrically connected to the plurality of first sub pixels R disposed in the 8k-3th column.

The two second sub data lines SDL2*a* and SDL2*b* can extend along the side surfaces of the two second sub pixels W disposed adjacent to each other in the row direction and can be connected to the second sub pixel W.

Specifically, the 2ath sub data line SDL2*a* can be disposed between a plurality of first sub pixels R disposed in the 8k-7th column and a plurality of second sub pixels W disposed in the 8k-6th column, and can be electrically connected to a plurality of second sub pixels W disposed in the 8k-6th column. Further, the 2b sub data line SDL2*b* can be disposed between the plurality of first sub pixels R disposed in the 8k-3th column and the plurality of second sub pixels W disposed in the 8k-2th column, and can be electrically connected to the plurality of second sub pixels W disposed in the 8k-2th column.

The two third sub data lines SDL3*a* and SDL3*b* can extend along the side surfaces of the two third sub pixels B disposed adjacent to each other in the row direction and can be electrically connected to the third sub pixel B.

Specifically, the 3ath sub data line SDL3-*a* can be disposed between the plurality of third sub pixels B disposed in the 8k-5th column and the plurality of fourth sub pixels G disposed in the 8k-4th column, and can be electrically connected to the plurality of third sub pixels B disposed in the 8k-5th column. Further, the 3bth sub data line SDL3*b* can be disposed between the plurality of third sub pixels B disposed in the 8k-1th column and the plurality of fourth sub pixels G disposed in the 8k-1th column, and can be electrically connected to the plurality of third sub pixels B disposed in the 8k-1th column.

The two fourth sub data lines SDL4*a* and SDL4W can extend along the side surfaces of the two fourth sub pixels G disposed adjacent to each other in the row direction and can be connected to the fourth sub pixel G.

Specifically, the 4ath sub data line SDL4*a* can be disposed between the plurality of third sub pixels B disposed in the 8k-5th column and the plurality of fourth sub pixels G disposed in the 8k-4th column, and can be electrically connected to the plurality of fourth sub pixels G disposed in the 8k-4th column. Further, the 4bth sub data line SDL4*b* can be disposed between the plurality of third sub pixels B disposed in the 8k-1th column and the plurality of fourth sub pixels G disposed in the 8kth column, and can be electrically connected to the plurality of fourth sub pixels G disposed in the 8kth column.

In this case, a first data voltage Vdata1 that is a red data voltage can be applied to the first data line DL1, a second data voltage Vdata2 that is a white data voltage can be applied to the second data line DL2, a third data voltage Vdata3 that is a blue data voltage can be applied to the third data line DL3, and a fourth data voltage Vdata4 that is a green data voltage can be applied to the fourth data line DL4.

Since the two first sub data lines SDL1*a* and SDL1*b* branch from the first data line DL1, the first data voltage Vdata1, which is a red data voltage, can also be applied to the two first sub data lines SDL1*a* and SDL1*b*.

Since the two second sub data lines SDL2*a* and SDL2*b* branch from the second data line DL2, the second data voltage Vdata2, which is a white data voltage, can also be applied to the two second sub data lines SDL2*a* and SDL2*b*.

Since the two third sub data lines SDL3*a* and SDL3*b* branch from the third data line DL3, the third data voltage Vdata3, which is a blue data voltage, can also be applied to the two third sub data lines SDL3*a* and SDL3*b*.

Since the two fourth sub data lines SDL4*a* and SDL4*b* branch from the fourth data line DL4, the fourth data voltage Vdata4, which is a green data voltage, can also be applied to the two fourth sub data lines SDL4*a* and SDL4*b*.

In this case, in order to drive the plurality of subpixels R, G, B, and W corresponding to one subpixel line, two gate lines can be disposed on two opposite sides of each subpixel line.

For example, the first gate line GL1 and the second gate line GL2 can be disposed on two opposite sides of the plurality of subpixels R, G, B, and W of the odd-numbered row, and the third gate line GL3 and the fourth gate line GL4 can be disposed on two opposite sides of the plurality of subpixels R, G, B, and W of the even-numbered row. In this case, the second gate line GL2 and the third gate line GL3 can be disposed between the plurality of subpixels R, G, B, and W of the odd-numbered row and the plurality of subpixels R, G, B, and W of the even-numbered row.

In this case, two pixels adjacent to each other in the row direction can be connected to different gate lines.

For example, the subpixels R, W, B, and G disposed in the 8k-7th to 8k-4th columns of the odd-numbered row can be connected to the first gate line GL1, and the subpixels R, W, B, and G disposed in the 8k-3th to 8kth columns of the odd-numbered row can be connected to the second gate line GL2. Further, the subpixels R, W, B, and G disposed in the 8k-7th to 8k-4th columns of the even-numbered row can be connected to the third gate line GL3, and the subpixels R, W, B, and G disposed in the 8k-3th to 8kth columns of the even-numbered row can be connected to the fourth gate line GL4.

Further, each of the plurality of reference voltage lines RVL can be disposed inside one pixel, and each of the driving voltage lines DVL to which the plurality of pixel high-potential voltages EVDD are applied can be disposed between the plurality of adjacent pixels.

Specifically, the plurality of reference voltage lines RVL can be disposed between the plurality of second subpixels W disposed in the 8k-6th column and the plurality of third subpixels B disposed in the 8k-5th column, and between the plurality of second subpixels W disposed in the 8k-2th column and the plurality of third subpixels B disposed in the 8k-1th column.

Further, the plurality of driving voltage lines DVL can be disposed between the plurality of fourth subpixels G disposed in the 8k-4th column and the plurality of first subpixels R disposed in the 8k-3th column, outside the plurality of first subpixels R disposed in the 8k-7th column, and outside the plurality of fourth subpixels G disposed in the 8kth column.

As described above, in the double rate driving (DRD) structure, one data line is disposed every two subpixels, so that when the number of subpixels in the column direction is m, the number of data lines DL can be decreased to m/2.

Figure 6:
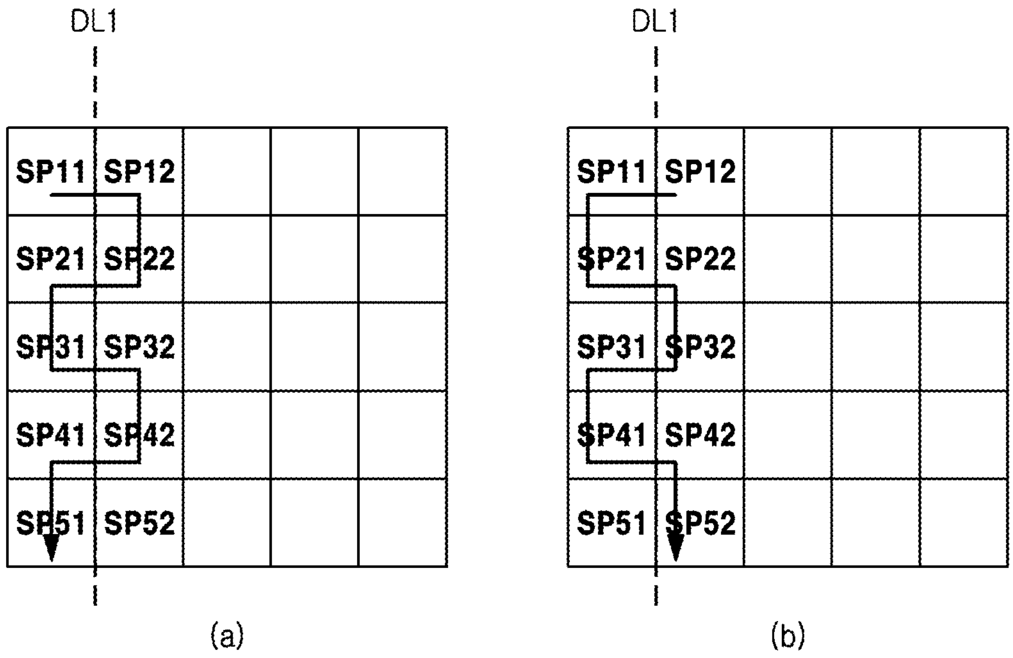
FIGS. 6 and 7 are views illustrating a driving sequence of subpixels sharing a data line in a display device having a double rate driving structure according to embodiments of the present disclosure.
Figure 7:
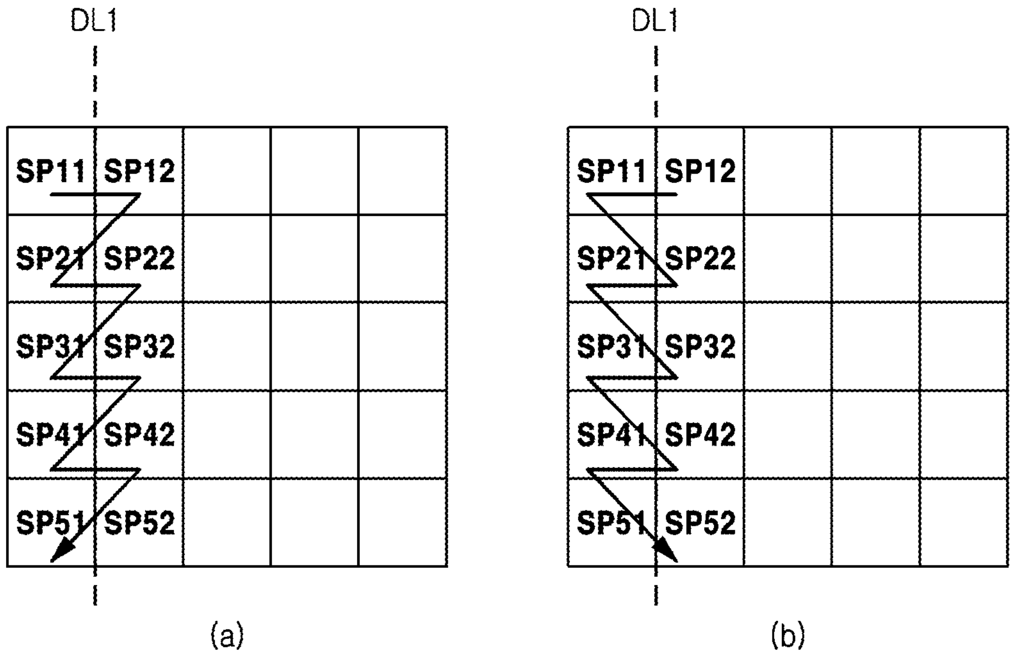

FIGS. 6 and 7 are views illustrating a driving sequence of subpixels sharing a data line in a display device having a double rate driving structure according to embodiments of the present disclosure.

Here, the case in which the subpixels SP11, SP21, SP31, SP41, and SP51 in the first column and the subpixels SP12, SP22, SP42, and SP52 in the second column share the first data line DL1 is described as an example. In this case, the subpixels SP11, SP21, SP31, SP41, and SP51 in the first column and the subpixels SP12, SP22, SP32, SP42, and SP52 in the second column can be subpixels of the same color positioned in adjacent pixels.

First, referring to (a) and (b) of FIG. 6, in the display device 100 having a double rate driving structure according to embodiments of the present disclosure, the subpixels SP11, SP21, SP31, SP41, and SP51 in the first column and the subpixels SP12, SP22, SP32, SP42, and SP52 in the second column sharing the first data line DL1 can be driven in a sequence for connecting adjacent subpixels in a straight line.

For example, the twelfth subpixel SP11 can emit light after the eleventh subpixel SP11 emits light, and the twenty first subpixel SP21 can emit light after the twenty second subpixel SP22 emits light in the direction in which the first data line DL1 extends. When the subpixel is driven in such a sequence, the sequence in which the subpixels emit light represents a shape of 2 and thus can be referred to as 2 sequence driving ((a) of FIG. 6)

On the other hand, when the twelfth subpixel SP12 emits light first in the first subpixel line, driving can be performed in the sequence of the twelfth subpixel SP12->the eleventh subpixel SP11->the twenty first subpixel SP21->the twenty second subpixel SP22. When the subpixel is driven in such a sequence, the sequence in which the subpixels emit light represents a shape of 5 and thus can be referred to as 5 sequence driving ((b) of FIG. 6)

Both 2 sequence driving and 5 sequence driving proceed along adjacent subpixels in the horizontal or vertical direction, but the driving sequence does not proceed along the diagonal direction, so they can be referred to as non-diagonal sequence driving.

Meanwhile, referring to (a) and (b) of FIG. 7, the display device 100 having a double rate driving structure according to embodiments of the present disclosure can be driven to include a sequence in a diagonal direction among the subpixels SP11, SP21, SP31, SP41, and SP51 in the first column and the subpixels SP12, SP22, SP32, SP42, and SP52 in the second column sharing the first data line DL1.

For example, the twelfth subpixel SP11 can emit light after the eleventh subpixel SP11 emits light, and the twenty second subpixel SP22 can emit light after the twenty first subpixel SP21 in the diagonal direction emits light. When the subpixel is driven in such a sequence, the sequence in which the subpixels emit light represents a shape of Z, and thus can be referred to as Z sequence driving ((a) of FIG. 7)

On the other hand, when the twelfth subpixel SP12 emits light first in the first subpixel line, driving can be performed in a sequence in which, after the twelfth subpixel SP12 and the eleventh subpixel SP11 emit light, the 22nd subpixel SP22 in the diagonal direction emits light and the 21st subpixel SP21 emits light. When the subpixel is driven in such a sequence, the sequence in which the subpixels emit light represents a shape of S, and thus can be referred to as S sequence driving ((b) of FIG. 7)

Both Z sequence driving and S sequence driving can proceed in the diagonal direction and be thus referred to as diagonal sequence driving.

As such, in a double rate drive (DRD) method in which one data line is shared by two subpixels, column-wise subpixels disposed in the direction in which the data line extends can operate in the non-diagonal sequence driving or diagonal sequence driving manner.

However, in the sequence in which subpixels are driven according to the double rate driving (DRD), the difference in data voltage between the subpixels which sequentially emit light, i.e., the data toggling amount, can increase according to the image pattern.

As described above, when the data toggling amount increases according to the driving sequence, the heat generation temperature of the data driving circuit can increase, resulting in an operation error or damage to the display device.

Accordingly, the display device 100 of the present disclosure can suppress an increase in the heat generation temperature of the data driving circuit by selecting a sequence driving method by which the data toggling amount can be minimized according to the image pattern input in the double rate driving structure.

Figure 8:
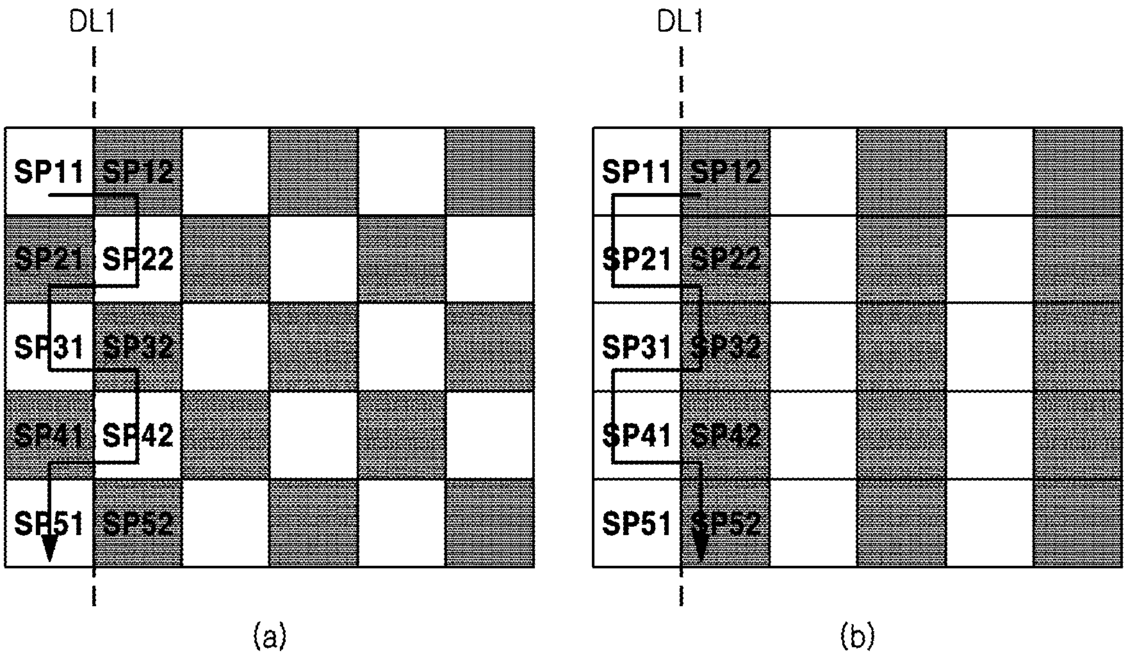
FIG. 8 is a view illustrating an example in which driving is performed in a non-diagonal sequence according to an image pattern in a display device having a double-rate driving structure according to embodiments of the present disclosure.

FIG. 8 is a view illustrating an example in which driving is performed in a non-diagonal sequence according to an image pattern in a display device having a double-rate driving structure according to embodiments of the present disclosure.

Referring to (a) and (b) of FIG. 8, the subpixels SP11, SP21, SP31, SP41, and SP51 in the first column and the subpixels SP12, SP22, SP32, SP42, and SP52 in the second column can share a first data line DL1. In this case, the subpixels SP11, SP21, SP31, SP41, and SP51 in the first column and the subpixels SP12, SP22, SP32, SP42, and SP52 in the second column can be subpixels of the same color positioned in adjacent pixels.

Here, (a) of FIG. 8 illustrates a dot pattern in which images of different luminance levels are alternately displayed in units of subpixels, and (b) of FIG. 8 illustrates a line pattern in which images of the same luminance level are displayed along a vertical line.

Images of different luminance levels frequently appear along lines in the horizontal or vertical direction in the dot-pattern image as illustrated in (a) of FIG. 8, but images of the same luminance level frequently appear in the diagonal direction. In other words, the dot-pattern image can be referred to as having a diagonal pattern in which more images of the same luminance level appear in the diagonal direction than in the horizontal or vertical direction.

Accordingly, when driving is performed in the non-diagonal sequence, such as 25 sequence driving, on the diagonal-pattern image such as a dot pattern in the display device 100 having the double rate driving structure, the data toggling amount in which the data voltage of the subpixel is varied along the horizontal or vertical direction increases.

On the other hand, images with the same luminance level frequently appear along lines in the horizontal or vertical direction in the line-pattern image as illustrated in (b) of FIG. 8, but images with different luminance levels can frequently appear in the diagonal direction. In other words, the line-pattern image can be referred to as having a non-diagonal pattern in which the image of the same luminance level frequently appears in the horizontal or vertical direction.

Accordingly, in the display device 100 having the double rate driving structure, when driving is performed in the non-diagonal sequence, such as 25 sequence driving, on the non-diagonal pattern image such as the line pattern, the interval in which the data voltages of the subpixels are the same along the sequence direction (horizontal or vertical direction) in which driving is performed increases, leading to a reduction in the overall data toggling amount.

In short, when driving is performed in the non-diagonal sequence such as 25 sequence driving on the diagonal pattern image such as the dot pattern, the data toggling amount can increase and, when driving is performed in the non-diagonal sequence such as 25 sequence driving on the non-diagonal pattern image such as the line pattern, the data toggling amount can decrease.

Figure 9:
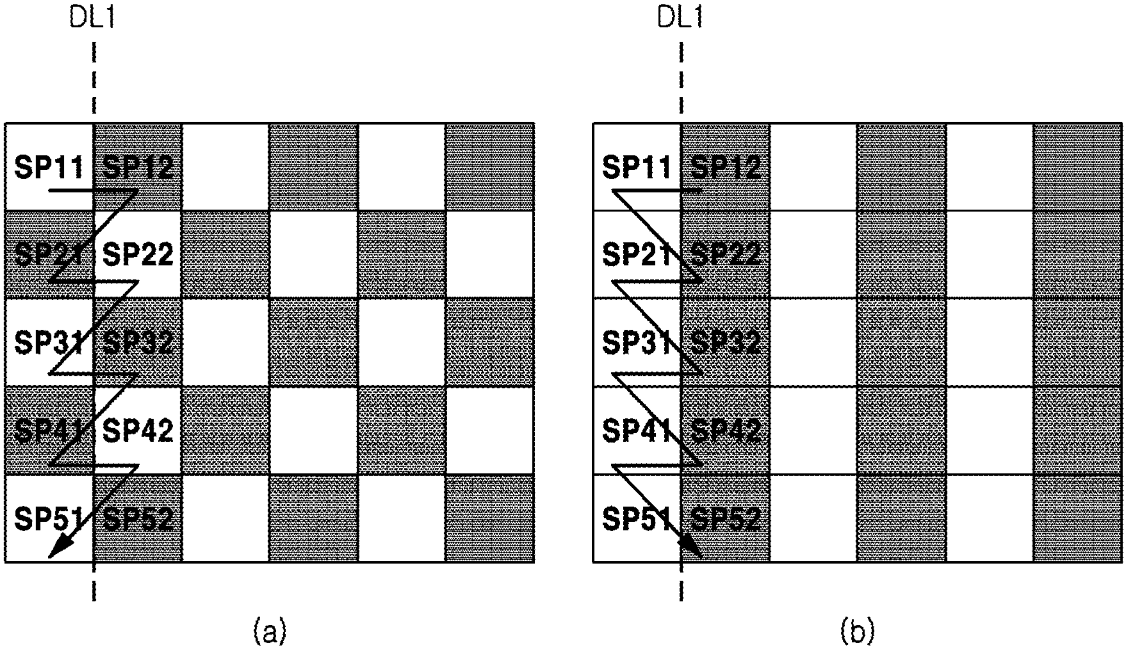
FIG. 9 is a view illustrating an example in which driving is performed in a diagonal sequence according to an image pattern in a display device having a double rate driving structure according to embodiments of the present disclosure.

FIG. 9 is a view illustrating an example in which driving is performed in a diagonal sequence according to an image pattern in a display device having a double rate driving structure according to embodiments of the present disclosure.

Referring to (a) and (b) of FIG. 9, the subpixels SP11, SP21, SP31, SP41, and SP51 in the first column and the subpixels SP12, SP22, SP32, SP42, and SP52 in the second column can share the first data line DL1. In this case, the subpixels SP11, SP21, SP31, SP41, and SP51 in the first column and the subpixels SP12, SP22, SP32, SP42, and SP52 in the second column can be subpixels of the same color positioned in adjacent pixels.

Images of different luminance levels frequently appear along lines in the horizontal or vertical direction in the dot-pattern image as illustrated in (a) of FIG. 9, but images of the same luminance level frequently appear in the diagonal direction.

Therefore, as driving is performed in the diagonal sequence such as ZS sequence driving on the diagonal pattern image such as the dot pattern, the data toggling amount in which the data voltage of the subpixel is varied can decrease.

On the other hand, images with the same luminance level frequently appear along lines in the horizontal or vertical direction in the line-pattern image as illustrated in (b) of FIG. 9, but images with different luminance levels can frequently appear in the diagonal direction.

Accordingly, when driving is performed in the non-diagonal sequence, such as 25 sequence driving, on the non-diagonal pattern image such as the line pattern, the data voltages of the subpixels are frequently varied along the sequence direction (horizontal or vertical direction), leading to an increase in the overall data toggling amount.

In short, when driving is performed in the diagonal sequence such as ZS sequence driving on the diagonal pattern image such as the dot pattern, the data toggling amount can decrease and, when driving is performed in the diagonal sequence such as ZS sequence driving on the non-diagonal pattern image such as the line pattern, the data toggling amount can increase.

Therefore, the display device 100 of the present disclosure can reduce the data toggling amount and the heat generation of the data driving circuit by performing driving in the diagonal sequence when the diagonal pattern image in which the images of the same luminance level frequently appear in the diagonal direction is input and performing driving the non-diagonal sequence when the non-diagonal pattern image in which the images of the same luminance level frequently appear in the horizontal or vertical direction is input.

Figure 10:
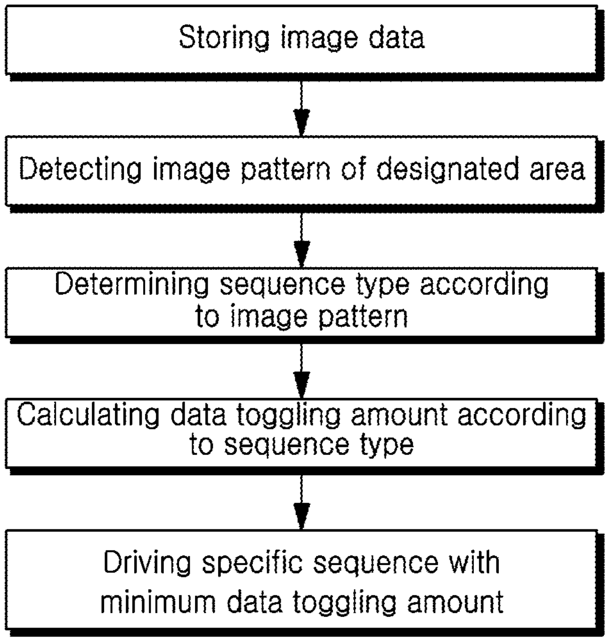
FIG. 10 is a flowchart illustrating in detail a display driving method according to embodiments of the present disclosure.

FIG. 10 is a flowchart illustrating in detail a display driving method according to embodiments of the present disclosure.

Referring to FIG. 10, a display driving method according to embodiments of the present disclosure can include storing image data, detecting an image pattern of a designated area, determining a sequence type according to the image pattern, calculating a data toggle amount according to the sequence type, and driving in a specific sequence with a minimum data toggle amount.

Storing the image data is a process of storing the image data DATA transferred from the host system to the display device 100 in the memory. In this case, the image data DATA stored in the memory can be stored in units of frames.

Detecting the image pattern of the designated area is a process of detecting the image pattern in units of areas for controlling sequence driving from the image data DATA of the frame unit stored in the memory.

In this case, the designated area can be the entire area of the display panel 110 corresponding to one frame, or can be a partial sub area in one frame of the display panel 110.

For example, when the data driving circuit 130 that supplies a data voltage to the display panel 110 includes a plurality of source driving integrated circuits SDIC, the individual area to which the data voltage is supplied by the source driving integrated circuit SDIC can be set as the designated area. In this case, in each designated area, the data toggling amount can be determined by the data voltage supplied by the source driving integrated circuit SDIC and, thus, considering the image pattern of each designated area, a different sequence type can be applied to each area controlled by the source driving integrated circuit SDIC.

Figure 11:
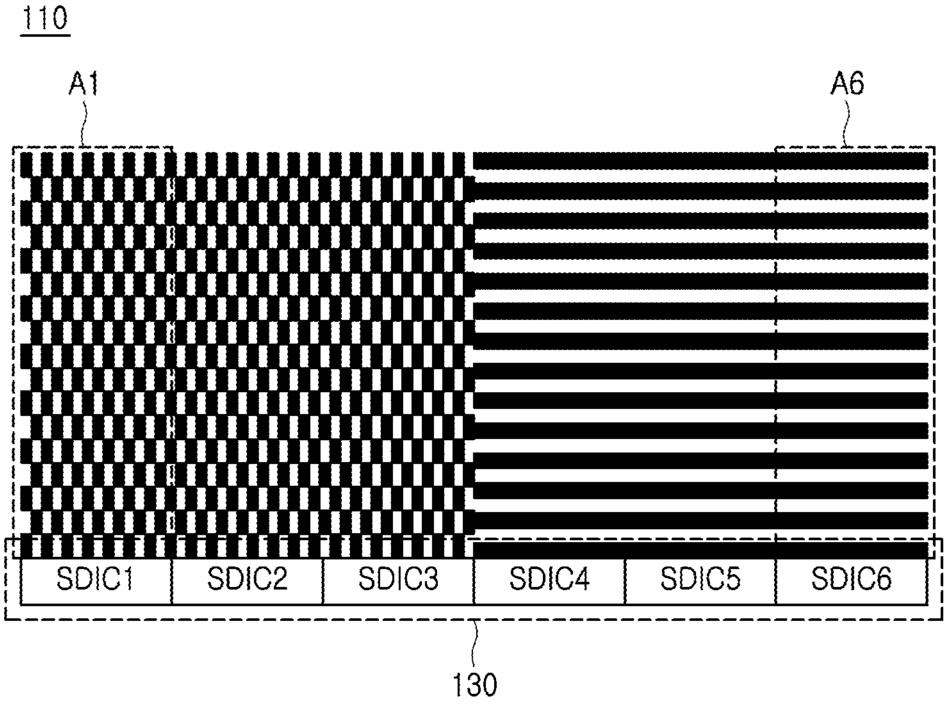
FIG. 11 is an example view illustrating an example in which a sequence type is determined for a designated area controlled by a source driving integrated circuit in a display driving method according to embodiments of the present disclosure.

FIG. 11 is an example view illustrating an example in which a sequence type is determined for a designated area controlled by a source driving integrated circuit in a display driving method according to embodiments of the present disclosure.

Referring to FIG. 11, in the display device 100 according to embodiments of the present disclosure, the data driving circuit 130 can include a plurality of source driving integrated circuits SDIC1 to SDIC6 that supply data voltages to different areas.

The number of source driving integrated circuits constituting the data driving circuit 130 can be varied, and here, the case in which the six source driving integrated circuits SDIC1 to SDIC6 are included in the data driving circuit 130 is illustrated as an example.

In this case, the active area of the display panel 110 can be divided into first to sixth areas A1 to A6 individually controlled by the six source driving integrated circuits SDIC to SDIC6.

Accordingly, in the display device 100 of the present disclosure, the timing controller 140 can detect an image pattern displayed in the first to sixth areas A1 to A6 from image data of one frame stored in the memory.

For example, when a dot pattern is displayed in the 1/2 area on the left and a line pattern is displayed in the 1/2 area on the right of the display panel 110, the timing controller 140 can determine the first to third areas A1 to A3 as having a dot pattern and determine the fourth to sixth areas A6 as having a line pattern.

In this case, the timing controller 140 can determine to drive the first to third areas A1 to A3 in a diagonal sequence type, and to drive the fourth to sixth areas A6 in a non-diagonal sequence type.

As another embodiment, in the display device 100 of the present disclosure, when the gate driving circuit 120 for supplying the gate signal to the display panel 110 includes a plurality of gate driving integrated circuits GDIC, the individual area to which the gate signal is supplied by the gate driving integrated circuit GDIC can be set as the designated area. In this case, the sequence type of the corresponding area can be determined by considering the image pattern of each designated area.

Figure 12:
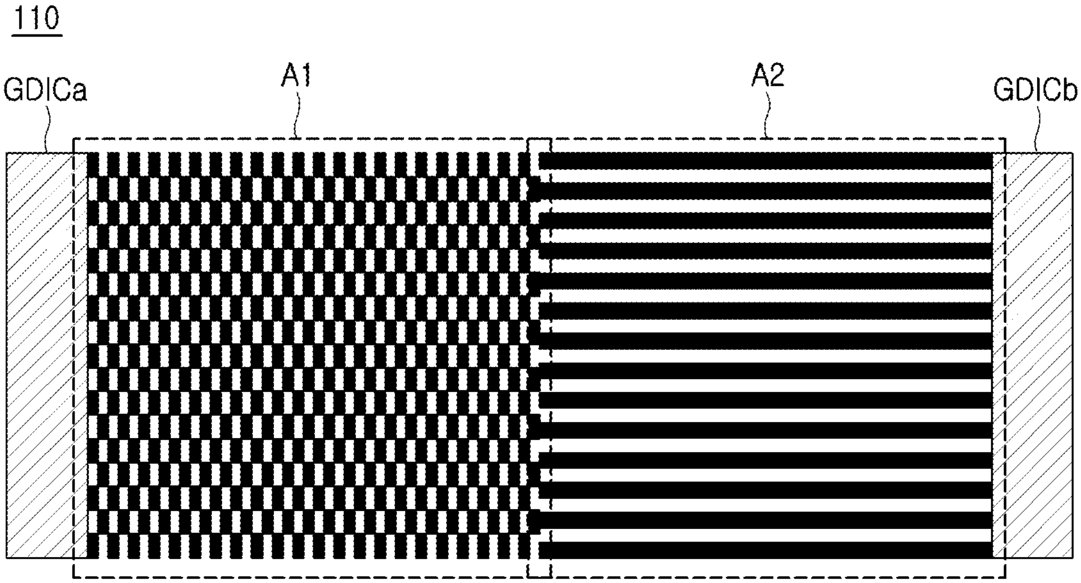
FIG. 12 is a view illustrating an example in which a sequence type is determined for a designated area controlled by a gate driving integrated circuit in a display driving method according to embodiments of the present disclosure.

FIG. 12 is a view illustrating an example in which a sequence type is determined for a designated area controlled by a gate driving integrated circuit in a display driving method according to embodiments of the present disclosure.

Referring to FIG. 12, in the display device 100 according to embodiments of the present disclosure, the gate driving circuit 120 can include a plurality of gate driving integrated circuits GDICa and GDICb that supply gate signals to different areas of the display panel 110.

The number of gate driving integrated circuits constituting the gate driving circuit 120 can be varied, and here, the case in which two gate driving integrated circuits GDICa and GDICb are disposed on the left and right sides of the display panel 110 is illustrated as an example.

In this case, the active area of the display panel 110 can be divided into a first area A1 and a second area A2 individually controlled by the two gate driving integrated circuits GDICa and GDICb.

Accordingly, in the display device 100 of the present disclosure, the timing controller 140 can detect an image pattern displayed in the first area A1 and the second area A2 from image data of one frame stored in the memory.

For example, when a dot pattern is displayed in the 1/2 area on the left and a line pattern is displayed in the 1/2 area on the right of the display panel 110, the timing controller 140 can determine the first area A1 as having a dot pattern and the second area A2 as having a line pattern.

Determining the sequence driving type according to the image pattern is a process of determining the sequence type in which the double rate driving DRD is performed based on the image pattern displayed in the designated area as described above.

The sequence type can be divided into a non-diagonal sequence type in which driving is performed along the subpixels adjacent in the horizontal or vertical direction and the driving sequence does not proceed along the diagonal direction, and a diagonal sequence type in which the driving sequence can proceed along the diagonal direction.

Further, the display driving method of the present disclosure can further determine a specific sequence driving method by which the data toggling amount is minimized by calculating the data toggling amount for the designated area after determining the sequence type for the designated area according to the image pattern.

Calculating the data toggling amount according to the sequence type is a process of accumulating deviations of data voltages sequentially applied along a sequence path in which subpixels are driven according to a double rate driving (DRD) method.

As such, by summing all of the deviations of the data voltages along the sequence path in which the subpixels are driven, the data toggling amount according to the driving sequence can be calculated.

For example, if the image to be displayed in the first area A1 has a dot pattern, the diagonal sequence type can be determined by the double rate driving method, and the data toggling amount according to the Z and S sequences included in the diagonal sequence type can be calculated.

Driving in the sequence with the minimum data toggling amount is a process of calculating the data toggling amount of the image to be displayed in the designated area with respect to the plurality of sequence driving methods included in the sequence type, and selecting the specific sequence with the minimum data toggling amount and driving the designated area.

Figure 13:
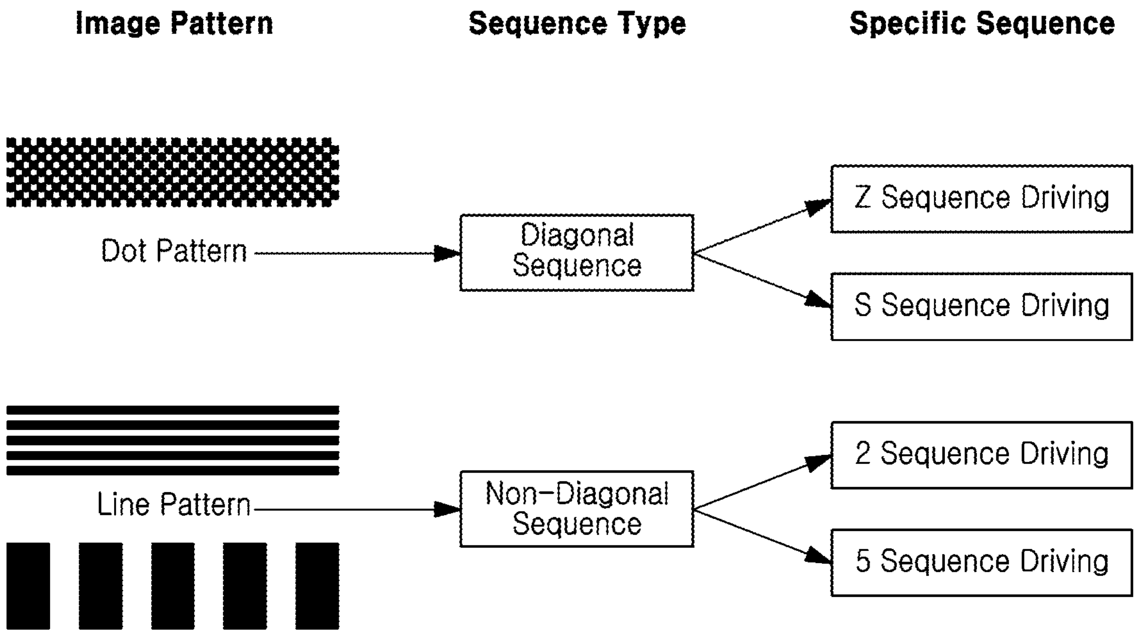
FIG. 13 is a conceptual view illustrating a display driving method according to embodiments of the present disclosure.

FIG. 13 is a conceptual view illustrating a display driving method according to embodiments of the present disclosure.

Referring to FIG. 13, the display device 100 according to embodiments of the present disclosure can detect an image pattern of a designated area from image data in units of frames stored in the memory.

In this case, if the image pattern of the designated area is the diagonal pattern in which more images of the same luminance level appear in the diagonal direction than in the horizontal or vertical direction, such as the dot pattern, the double rate driving method is selected as the diagonal sequence type.

Then, the specific sequence driving method with the minimum data toggling amount can be selected by calculating the data toggling amount when displaying the image of the designated area according to the Z sequence driving method and the S sequence driving method included in the diagonal sequence type.

On the other hand, when the image pattern of the designated area is a non-diagonal pattern in which more images of the same luminance level appear in the horizontal or vertical direction than in the diagonal direction, such as the line pattern, the double rate driving method is selected as the non-diagonal sequence type.

Then, the specific sequence driving method with the minimum data toggling amount can be selected by calculating the data toggling amount when displaying the image of the designated area according to the 2 sequence driving method and the 5 sequence driving method included in the non-diagonal sequence type.

As described above, the display device 100 of the present disclosure can reduce the heat generation amount of the data driving circuit by determining the sequence type of the double rate driving method according to the image pattern to be displayed in the designated area of the display panel 110 and selecting a specific sequence driving method with the minimum data toggling amount among the sequence types.

A display device according to embodiments of the present disclosure can be described as follows.

A display device can comprise a display panel in which two subpixels share one data line and are disposed to be controlled by two different gate signals, a gate driving circuit supplying a gate signal to the display panel, a data driving circuit supplying a data voltage to the display panel, a memory configured to store image data to be displayed on the display panel, a timing controller configured to determine a sequence type based on an image pattern of a designated area detected from the image data and to control the gate driving circuit and the data driving circuit so that the designated area is driven according to a selected final sequence.

The two subpixels sharing one data line can be subpixels disposed in two adjacent pixels to emit light of the same color.

The data driving circuit can include a plurality of source driving integrated circuits. The designated area can be a sub area to which a data voltage is supplied by each of the plurality of source driving integrated circuits.

The gate driving circuit can include a plurality of gate driving integrated circuits. The designated area can be a sub area to which a gate signal is supplied by each of the plurality of gate driving integrated circuits.

The image pattern can include a diagonal pattern in which more images of the same luminance level appear in a diagonal direction than in a horizontal/vertical direction, and a non-diagonal pattern in which more images of the same luminance level appear in the horizontal/vertical direction than in the diagonal direction.

The sequence type can include a non-diagonal sequence in which a driving sequence proceeds only along subpixels adjacent in the horizontal/vertical directions, but the driving sequence does not proceed along the diagonal direction, and a diagonal sequence in which the driving sequence proceeds along the horizontal/vertical direction and the diagonal direction.

The timing controller can determine the sequence type as the diagonal sequence when the image pattern is the diagonal pattern.

The diagonal sequence can include a Z-sequence in which the driving sequence proceeds in a shape of Z from a first row, first column (also referred to as a first row-first column) subpixel of the designated area, and an S-sequence in which the driving sequence proceeds in a shape of S from a first row, second column (first row-second column) subpixel of the designated area.

The timing controller can determine, when the image pattern is the diagonal pattern, a sequence with a smaller data toggling amount between the Z-sequence and the S-sequence as the final sequence.

The timing controller can determine the sequence type as the non-diagonal sequence when the image pattern is the non-diagonal pattern.

The non-diagonal sequence can include a 2-sequence in which the driving sequence proceeds in a shape of 2 from a first row-first column subpixel of the designated area, and a 5-sequence in which the driving sequence proceeds in a shape of 5 from a first row-second column subpixel of the designated area.

The timing controller can determine, when the image pattern is the non-diagonal pattern, a sequence with a smaller data toggling amount between the 2-sequence and the 5-sequence as the final sequence.

According to aspects of the present disclosure, a method for driving a display panel in which two subpixels share one data line and are disposed to be controlled by two different gate signals can comprise storing image data, detecting an image pattern of a designated area, determining a sequence type according to the image pattern, calculating a data toggling amount according to the sequence type, and driving with a final sequence with a minimum data toggling amount.

Determining the sequence type can determine the sequence type as the diagonal sequence when the image pattern is the diagonal pattern.

The final sequence can be determined as a sequence with a smaller data toggling amount among diagonal sequences when the image pattern is the diagonal pattern.

Determining the sequence type can determine the sequence type as the non-diagonal sequence when the image pattern is the non-diagonal pattern.

The final sequence can be determined as a sequence with a smaller data toggling amount among diagonal sequences when the image pattern is the diagonal pattern.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure. The above description and the accompanying drawings provide an example of the technical idea of the present disclosure for illustrative purposes only. For example, the disclosed embodiments are intended to illustrate the scope of the technical idea of the present disclosure.

What is claimed is:

1. A display device comprising:

a display panel in which two subpixels share one data line and are disposed to be controlled by two different gate signals;

a gate driving circuit configured to supply a gate signal to the display panel;

a data driving circuit configured to supply a data voltage to the display panel;

a memory configured to store image data to be displayed on the display panel; and a timing controller configured to determine a sequence type based on an image pattern of a designated area detected from the image data and to control the gate driving circuit and the data driving circuit so that the designated area is driven according to a selected final sequence, wherein the two subpixels sharing the one data line are subpixels disposed in two adjacent pixels to emit light of a same color, and are respectively connected to two sub data lines branched from the one data line.

2. The display device of claim 1, wherein the two adjacent pixels are respectively connected to two different gate lines to which the two different gate signals are applied.

3. The display device of claim 1, wherein the data driving circuit includes a plurality of source driving integrated circuits, and wherein the designated area is a sub area to which a data voltage is supplied by each of the plurality of source driving integrated circuits.

4. The display device of claim 1, wherein the gate driving circuit includes a plurality of gate driving integrated circuits, and wherein the designated area is a sub area to which a gate signal is supplied by each of the plurality of gate driving integrated circuits.

5. The display device of claim 1, wherein the image pattern includes:

a diagonal pattern in which more images of a same luminance level appear in a diagonal direction than in a horizontal or vertical direction; and a non-diagonal pattern in which more images of a same luminance level appear in the horizontal or vertical direction than in the diagonal direction.

6. The display device of claim 5, wherein the sequence type includes:

a non-diagonal sequence in which a driving sequence proceeds only along subpixels adjacent in the horizontal or vertical directions, but the driving sequence does not proceed along the diagonal direction; and a diagonal sequence in which the driving sequence proceeds along the diagonal direction and one of the horizontal direction or the vertical direction.

7. The display device of claim 6, wherein the timing controller determines the sequence type as the diagonal sequence when the image pattern is the diagonal pattern.

8. The display device of claim 7, wherein the diagonal sequence includes:

a Z-sequence in which the driving sequence proceeds in a shape of Z from a first row-first column subpixel of the designated area; and an S-sequence in which the driving sequence proceeds in a shape of S from a first row-second column subpixel of the designated area.

9. The display device of claim 8, wherein the timing controller determines, when the image pattern is the diagonal pattern, a sequence with a smaller data toggling amount between the Z-sequence and the S-sequence as the final sequence.

10. The display device of claim 6, wherein the timing controller determines the sequence type as the non-diagonal sequence when the image pattern is the non-diagonal pattern.

11. The display device of claim 10, wherein the non-diagonal sequence includes:

a 2-sequence in which the driving sequence proceeds in a shape of 2 from a first row-first column subpixel of the designated area; and a 5-sequence in which the driving sequence proceeds in a shape of 5 from a first row-second column subpixel of the designated area.

12. The display device of claim 11, wherein the timing controller determines, when the image pattern is the non-diagonal pattern, a sequence with a smaller data toggling amount between the 2-sequence and the 5-sequence as the final sequence.

13. A method for driving a display panel in which two subpixels share one data line and are disposed to be controlled by two different gate signals, the method comprising:

storing image data;

detecting an image pattern of a designated area;

determining a sequence type according to the image pattern;

calculating a data toggling amount according to the sequence type; and driving with a final sequence with a minimum data toggling amount.

14. The method of claim 13, wherein the image pattern includes:

a diagonal pattern in which more images of a same luminance level appear in a diagonal direction than in a horizontal or vertical direction; and a non-diagonal pattern in which more images of a same luminance level appear in the horizontal or vertical direction than in the diagonal direction.

15. The method of claim 14, wherein the sequence type includes:

a non-diagonal sequence in which a driving sequence proceeds only along subpixels adjacent in the horizontal or vertical directions, but the driving sequence does not progress along the diagonal direction; and a diagonal sequence in which the driving sequence proceeds along the diagonal direction and one of the horizontal direction or the vertical direction.

16. The method of claim 15, wherein the determining of the sequence type determines the sequence type as the diagonal sequence when the image pattern is the diagonal pattern.

17. The method of claim 16, wherein the final sequence is determined as a sequence with a smaller data toggling amount among diagonal sequences when the image pattern is the diagonal pattern.

18. The method of claim 15, wherein the determining of the sequence type determines the sequence type as the non-diagonal sequence when the image pattern is the non-diagonal pattern.

19. The method of claim 18, wherein the final sequence is determined as a sequence with a smaller data toggling amount among diagonal sequences when the image pattern is the diagonal pattern.

* * * * *